United States Patent [19]

Gurfinkel et al.

[11] Patent Number: 5,240,608
[45] Date of Patent: Aug. 31, 1993

[54] APPARATUS FOR WASTE FREE DREDGING OF WATERWAYS AND THE FABRICATION OF BUILDING MATERIALS

[76] Inventors: Alex H. Gurfinkel, 11 Camelot Ct., #1A, Brighton, Mass. 02135; Vladimir Shepsis, 17202 NE. 85th Pl. #0233, Redmond, Va. 98052

[21] Appl. No.: 767,147

[22] Filed: Sep. 27, 1991

[51] Int. Cl.$^5$ .......................... C04B 14/02; B03C 7/00
[52] U.S. Cl. ..................... 210/319; 210/170; 210/178; 210/184; 210/205; 210/223; 210/224; 210/243; 210/380.1; 106/737; 106/738; 106/739; 106/740; 209/127.1; 209/127.4; 425/406; 523/131; 523/220
[58] Field of Search ............... 210/170, 175, 178, 189, 210/205, 223, 224, 243, 294, 319, 380.1, 406, 521, 409, 412, 708; 106/705, 737, 738, 739, 740; 264/37; 37/54, 61; 209/127.1, 127.4; 425/406, 412, 413; 204/149, 132; 523/131, 220

[56] References Cited

U.S. PATENT DOCUMENTS

| | | | |
|---|---|---|---|
| 3,402,814 | 9/1968 | Morel et al. | 209/127.1 |
| 4,021,401 | 5/1977 | Jeppsen | 523/131 |
| 4,541,927 | 9/1985 | Breidenbaugh | 210/170 |
| 4,559,117 | 7/1986 | Luxemberg | 210/708 |
| 4,610,616 | 9/1986 | Kosman | 425/413 |
| 4,772,330 | 9/1988 | Kobayashi et al. | 106/705 |
| 4,828,393 | 5/1989 | Smals et al. | 106/705 |
| 5,084,165 | 1/1992 | Wang et al. | 210/221.2 |

OTHER PUBLICATIONS

Shepsis, "Waste-free technologies for the dredging works in the seas, rivers, channels and ports," Modern Technologies Under Transport Construction, Bulgaria, (1989) and translation of p. 207 thereof.

Shepsis, Muntyan, "Experience of Solving Environmental Problems as Part of Dredging Works in the Sea and River," Sov. American Symp. on Dredging and Environmental Problems, Leningrad, USSR, pp. 49–59 (1990).

Souder, P. S., et al., Dredged Material Transport Systems for Inland Disposal and/or Productive Use Concepts. TRxD-78 28, U.S. Army Engineer Waterway Experiments Station, Vicksburg, Miss. pp. 25-34 1978.

*Primary Examiner*—Robert A. Dawson
*Assistant Examiner*—David Reitsnyder
*Attorney, Agent, or Firm*—Steven J. Weissburg

[57] ABSTRACT

This invention relates generally to dredging under harbors and waterways and fabricating building materials and more particularly to an apparatus for dredging that produces no waste and uses the dredged material for useful building products. Furthermore, all off the equipment that is used for the dredging and fabricating building materials from the dredged materials placed upon at least one floating badge.

15 Claims, 3 Drawing Sheets

APPARATUS FOR WASTE FREE DREDGING OF WATERWAYS AND THE FABRICATION OF BUILDING MATERIALS

BACKGROUND OF THE INVENTION

In order to create safe, navigable depths in sea and river ports and channels, periodic maintenance dredging must be undertaken. The size of these operations is huge; in the United States alone the annual volume of dredged silt exceeds 300 million cubic yards, or 270 million cubic meters.

Known processes generally include three operations: digging, transportation and disposal of soil. Known processes employ either suction (e.g. hopper, cutterhead and dustpan) or mechanical (e.g. dipper, ladder and clam shell) digging techniques. The dredgers alone, or with the aid of barges, forced pipelines, and conveyers, are able to transport the dredged material to either an ungerwater or upland (on shore) disposal site. (Souder P. S. et al, *Dredged Material Transport Systems for Inland Disposal and/or Productive Use Concepts*, TRxD—78-28, 1978, U.S. Army Experiments Station, CE Vicksburg, Miss.)

Because the entire dredging process spans over a vast space, the surrounding environment is often harmed during dredging, especially during the transportation and disposal stages. Though there are several environments adversely affected by the dredging process, the two predominant are the sea water and the sea bottom.

While the dredged soil is being transported to the disposal site, much of the material is released into the water and ultimately increases the surrounding turbidity. The soil does more harm than to simply make the water more cloudy; it also harms many microorganisms which are particularly sensitive to changes in the environment.

Released soil affects the sea bottom even more severely. The released soil blankets much of the floor adjacent the dredging site and removal route and depresses many kinds of biota, including both plant and animal life.

While underwater and upland disposal technologies both can harm the environment in the above-stated manner, they do so differently. With under water disposal, the soil is transported in the holds of barges or in hopper dredges During this process, about four percent of the total soil volume is inadvertently released into the water. (Tavolard, J. F. 1984. "A Sediment Budget Study of Clamshell Dredging and Ocean Disposal Activities in new York Bight, "*Environmental Geology and Water Science* 6#3 1984, pp. 133-140). Much of the soil does not reach the bottom, but disperses throughout the water, adversely affecting the biota's environment. In fact, when the depth of the disposal site is greater than 400 feet, virtually none of the soil reaches the bottom.

In the case of upland disposal, the soil may be transported via pipeline as a watery pulp. The concentration of the pulp is very low; the ratio by weight between the soil and water is from 1/7 to 1/15, or one part of soil to every 7 to 15 parts of water. At the disposal site, the soil is separated from the water, and the water is returned to the sea or river as an effluent, or discharge. Because some soil remains in the returned water, pollution of the water environment is very likely. Calculations have shown that every 500 cubic m. of soil dredged can potentially pollute up to 40 sq. km. of sea. In addition, the volume and types of contaminants originally in the soil and water affect the extent of the environmental damage.

To alleviate and even altogether avoid the above problems, the soil transportation and disposal operations must be removed from the dredging process.

OBJECTS OF THE INVENTION

Thus, the several objects of the invention include to provide a dredging system that minimizes the pollution and damage to underwater and upland disposal sites. A further object is to provide such a dredging system that eliminates the transportation and disposal of dredged soil. Still a further object is to provide a dredging system that makes use of the dredged material.

SUMMARY OF THE INVENTION

In a first preferred embodiment, the invention is an apparatus comprising means for raising sediment from beneath a waterway to the surface of the waterway and buoyant mans for fabricating building materials from said sediment.

The apparatus may also include means for fabricating lightweight aggregate, or means for fabricating molded brick, or both.

In another preferred embodiment, the apparatus of the invention further comprises means for removing water entrained in the sediment and means for purifying the removed water.

In yet another preferred embodiment, the apparatus of the invention further comprises aeration and ionization equipment for separating the raised sediment into coarse components and fine components, which settle in different parts of a holding tank.

In yet another preferred embodiment of the apparatus of the invention, a magnetic conditioner coagulates impurity particles in the water removed from the sediment, and the coagulated particles are removed from the water by mechanical means.

A first preferred embodiment of the method of the invention comprises the steps of raising sediment from beneath a waterway to the surface of the waterway and fabricating building materials from the raised sediment upon buoyant means for fabricating building materials from said sediment.

A second preferred embodiment of the method of the invention further comprises after the raising step, the step of separating relatively fine grained particles from relatively coarse grained particles and fabricating lightweight aggregate from the former and molded brick from the latter.

Yet another preferred embodiment of the method of the invention accomplishes the separating step by the steps of: aerating the raised sediment, ionizing said raised sediment, and distributing the sediment in a holding tank, having an inlet, such that the relatively coarse gained sediment accumulates nearer to the inlet than does the relatively fine grained sediment.

The dredging process of the instant invention minimizes environmental damage and produces new, useful material from the dredged silt. The soil is transformed into molded brick or lightweight aggregate on a buoyant barge located at the dredging site and thus the process of the invention avoids any need for soil disposal. Soil transportation is eliminated as all production operations are conducted on the floating dredging barge itself.

Preliminary laboratory investigations and industrial tests are described in "Experience of solving environmental problems as part of the dredging works in the sea and river." Shepsis, V. I. 1990. Soviet-American Symposium on Dredging and Environmental Problems. Leningrad, USSR pp. 56–57.

Other objects, features and advantages will appear from the following detailed description of a preferred embodiment of the invention.

DETAILED DESCRIPTION OF PREFERRED EMBODIMENTS OF THE INVENTION

There are at least two kinds of building material which can be produced from dredged soil—molded brick and lightweight aggregate. The physical and chemical properties of the dredged soil match the materials used in making such building materials. The specific product which can be made from this raw material depends, however, on the mineralogical makeup and cilicate analysis of the soil and the concentration of contaminants in the dredged soil.

The soil basically consists of sand, loam, silt and clay. Loam is a rich soil composed of clay, sand and some organic matter. Sand may be used as a building material if it does not contain any chemical contaminants. However, more than 80% of dredged soil contains combinations of sand, silt, clay and loam. Thus, one must be aware of the specific composition of the dredged soil.

Soil which contains sand and silt, sand and clay, or sand and loam, can be used in the production of molded brick. Soil which contains combinations of silt, loam and clay can be used to produce lightweight aggregate. (Shepsis, V. I., and others. 1989. "Waste-free technologies for the dredging works in the seas, river channels and ports," *Modern Technologies Under Transport Construction*. Bulgaria p. 207). Soil that contains sand cannot be readily converted to lightweight aggregate because silica or quartz minerals decelerate the processes of melting and converting soil components into a pyroplastic state. To use the soil for either brick or aggregate, the moisture level must be reduced to 18–20% by weight.

The problematic disposal operation can be eliminated according to the present invention if certain conditions are fulfilled.

If the dredged soil consists of several different materials, such as silt, clay and sand, the material must be uniformly distributed throughout the volume of soil. The dredged soil must have a moisture content of less than 18–20% by weight and therefore must be dewatered before forming into building materials. The dredged soil must be refined until an appropriately low level of contaminants remains.

Finally, the water involved in the process must be treated, to remove soil and non-soil contaminants.

Figure 1:
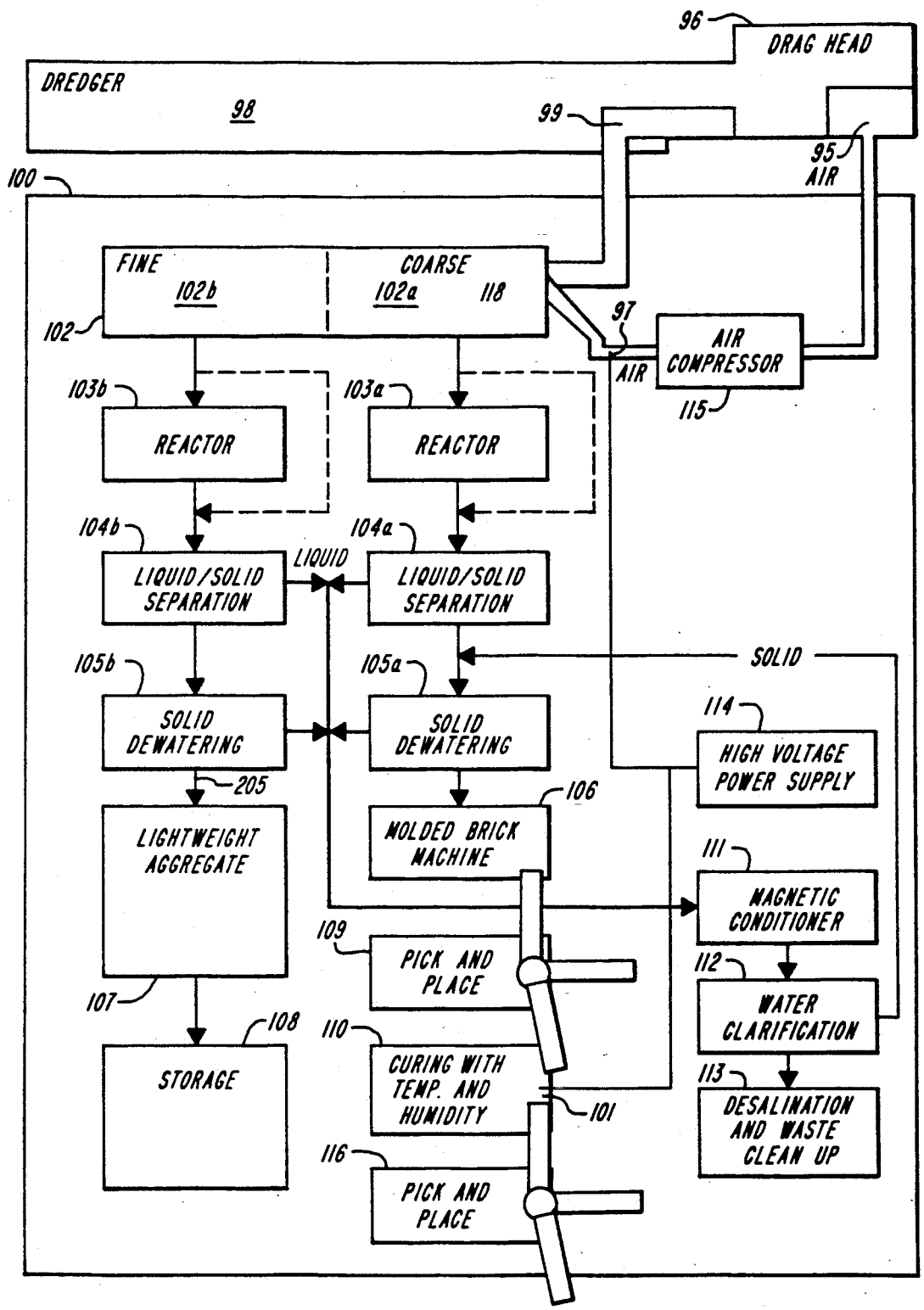
FIG. 1 shows schematically the apparatus of the invention and the flow of material according to an embodiment using a suction dredger.

Referring now to FIG. 1, the apparatus of the invention is carried on a barge 100 or boat and moves itself or is moved by a tugboat and links with a suction dredger 98 and drag head 96. The barge 100 carries a hold 102 (which could alternatively be carried by a separate barge or other buoyant unit) and two production lines, one for molded brick and one for lightweight aggregate. Each line includes a reactor (103a and 103b), a solid/liquid separating unit (104a and 104b), and a solid dewatering unit (105a and 105b). The line for molded brick includes equipment 106 to produce the molded brick and storage bins 110 with a temperature and humidity chamber. The aggregate line includes equipment 107 to produce lightweight aggregate and lightweight aggregate storage 108, and "pick up and place" robots 109 and 116.

A water purification process line includes magnetic conditioner 111, water clarification equipment 112 and water desalination and waste clean-up equipment 113. High-voltage power supply 114 with electrode 97 and air compressor 115 are common to both production lines, each of which includes a system of pipes, pumps and conveyers, which transport pulp, water, cake and building material.

The present invention employs special pulp concentration equipment to reduce the volume of water entering the system and thus, the volume of water that must be removed from the soil. The pulp concentration system is linked directly with the suction head 96 of the dredger in the case of a vacuum dredger shown in FIG. 1. Within the suction mouth, an aerator 95, powered by air supply 115, produces bubbles of air, which then attach themselves to the soil particles, lifting them by buoyancy toward the hold 102. The soil floats through the system. Due to the presence of the air bubbles, the volume of water passing through the system is somewhat reduced. Ultimately, the concentration of solid soil in the solution is increased.

In most dredging operations, the soil is a mixture which includes sand, loam, clay and/or silt. As mentioned above, to make brick and aggregate, the mixture of constituents in the dredged soil must be uniform. However, the mixtures are almost always distributed nonuniformly. Conventional dredging is unable to produce the required evenly distributed mixture.

Figure 3:
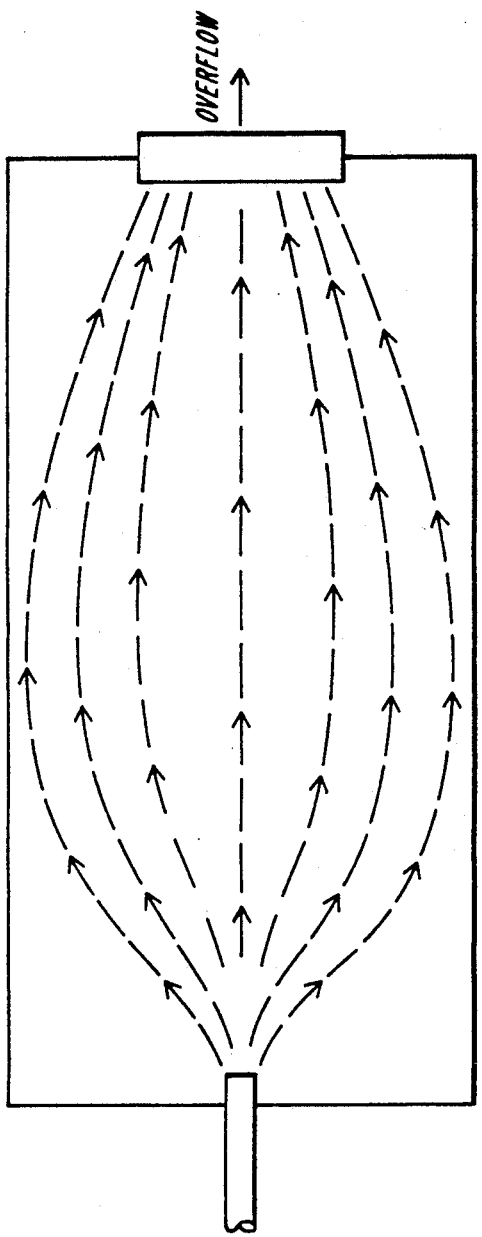
FIG. 3 shows schematically a plan view of the distribution of flow of sediment in a hold.

In known systems, pulp discharges through an inlet pipe which is placed at one side of the dredge's hold. An outlet weir is placed at the opposite side of the hold. Entering and exiting flows create a system of currents in the hold. The velocity of these currents vary while crossing the hold from the inlet to the weir. Theoretically, variations of the velocity correspond to the square of the cross sectional area of the flow in the hold. FIG. 3 represents an example of a theoretical distribution of flow velocity in a dredger's hold. The cross-section of the hold is an abrupt increase over the cross-section in the inlet pipe. Accordingly, as the flow diverges, the velocity decreases.

Figure 4:
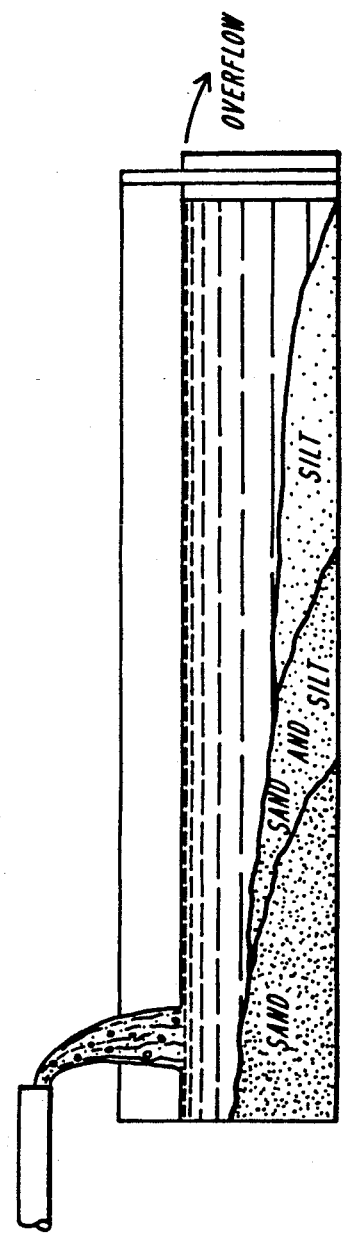
FIG. 4 shows schematically the theoretical distribution and separation of sediment in a hold.

Each of the components of dredged soil, i.e., sand, silt clay, etc., has a characteristic hydraulic fall velocity, which defines the speed of sedimentation and depends predominantly on particle size. The effect of particle density on hydraulic fall velocity is negligible for engineering purposes. For example for sandy particles of about 1.0 mm, fall velocity is 30.0–40.0 mm/sec. For silt, sized at 0.01 mm, the fall velocity is approximately 0.05 mm/sec. Thus, in spite of the fact that sand particles and silt are both rather fine grained materials, the fall velocities differ significantly. According to these principals, theoretically the dredged soil throughout the hold in calm water or in steady, uniform flow, will separate according to hydraulic fall velocity. The example of such a theoretical type of soil separation is shown at FIG. 4.

In realty, because of the complicated interaction of currents in the hold, the theoretical distribution of soil is unlikely.

The present invention overcomes this distribution problem by employing an air ionization stage. The inlet pipe 118 into the hold 102 includes an aerator 43 connected with the air compressor 115 and equipped with ion production electrodes 97. The air compressor generates micro bubbles which attach themselves to the particles of soil. The high voltage from power supply 114 ionizes the air in the bubbles, which, in turn, increases the ability of the bubbles to attach themselves to the soil. A suitable power supply is available from Ion Systems, Inc., of Berkeley, Calif., having a capacity of approximately 500 volts.amps. Due to the differences in the size and weight between the sand particles and silt, the micro bubbles affect them in different ways. The small bubbles are able to lift silt or clay particles but do not have enough lifting capacity to transport the relatively larger particles of sand. Therefore, the sand and other relatively coarse particles will settle near the area to the inlet pipe where the aerator is placed. Fine particles will settle down at the other side of the hold.

To achieve the best separation of the dredged soil small micro bubbles are generated. The exact size of the bubbles must be determined for each industrial condition (soil characteristics, dredger specifications, etc.). As a starting point, the dimensions of the micro bubbles should be approximately two to three times the dimensions of the silt particles. The finer soil then floats to the surface and is transported away from the inlet pipe. The electrodes are powered by the high voltage power supply 114. Suitable high voltage equipment is sold by Ion System, Inc., 10th St., Berkeley, Calif.

Thus in the hold 102, the sediment which makes up the pulp partially separate and divide into two parts. Coarse sediments, which will be used for molded brick, are deposited in subhold 102a nearer the inlet 118 to the hold; fine sediments, which will be used for lightweight aggregate, are deposited further away from the inlet in subhold 102b.

If the dredged soil contains organic contaminants, such as oil, grease, PCB's, etc., the sediments from the holds 102a and 102b are directed to the respective reactors 103a and 103b to be cleaned.

If the sediment has no need for such treatment, it bypasses the reactors 103a, 103b and travels directly to the liquid/solid separators 104a and 104b.

The present invention is able to rid the soil of organic and inorganic contaminants, such as oil, pesticides, and even heavy metals. The reactors 103a and 103b operate by transforming the heavy metals from the solid phase into water solutions of oxides and salts by means of chelating agents such as sulpher, citric, tartaric and or other acids and agents, sold by Pfizer, Inc. of New York, N.Y. A suitable 75HP, 120 cubic meter reactor is sold by Proquip, Inc. of Macedonia, Ohio, under the trade designation HiFlow Mixer.

The Dewatering Process

As has been mentioned above, in order to fabricate bricks or aggregate, the material must be partially dry. The amount of water in the soil, which has a minimum 120% moisture level after suction dredging or mechanical dredging, must be reduced to 12–18%. "Moisture level" is defined as the ratio of the water weight to dry soil weight per unit of moist soil.

Conventional methods use natural evaporation through the sun's radiation. (Huliburton, T. A. 1978. "Guidelines for Dewatering/Densifying Confined Dredged Material," Technical Report DS-78-11. U.S. Engineer Waterways Experiments Station. Vicksburg, Miss.) Additionally, drainage trenches on the disposal surface are sometimes used to accelerate the drying process.

However, such traditional techniques are not adequate to create building material for several reasons. First, it takes a very long time (more than four months) to reach a soil moisture content of 20% if the depth of material exceeds two feet. Second, the distribution of moisture throughout the soil is not uniform; the top soil becomes much drier than the bottom soil. The process of producing molded brick and lightweight aggregate requires a uniform distribution of moisture throughout the raw material.

As has been mentioned above, one method by which the invention reduces the moisture content of the soil throughout the system is to surround the soil with an air bubble as it enters the system, thereby reducing the water entering the system at the very outset. The invention also uses liquid/solid separation equipment 104a, 104b, such as a centrifuge to separate the liquid from the solid. This equipment is able to separate soil and water due to their different densities. The denser water migrates toward the outer circumference of the centrifuge, where it is withdrawn. Greater centripetal acceleration results in a more effective, dewatering process. This method reduces the moisture content to 40–30%. A suitable centrifuge is available from Bird Machine Company of South Walpole, Mass., model number 44*132, having a solid bowl and a capacity of 200 h.p.

In the next stage, the invention uses solid dewatering equipment 105a, 105b, such as a belt press, to express more water from the now semi-solid soil cake. The belt may be constructed by woven polyester and drains the water from the solids. Further separation takes place when the cake is pressed between rubber-covered rolls. A suitable roll press is available from Or-Tec, Inc., of Bedford, Ohio, under the model numbers MS/SS/1000 or MS/SS/1500, having a belt of from about 0.5 to 2 meters, variable speed motor, and feed, pressure and tracking rollers

Treating the Water

It is also necessary to remove the residue of soil which remains in the water that exits from liquid/solid separation equipment 104a, 104b and solid dewatering equipment 105a, 105b, after the dewatering process. The outputs from both of these sets of equipment join and pass in series to magnetic conditioning equipment 111 and water clarification equipment 112. The magnetic conditioner 111 accelerates the coagulation of any fine metallic particles by means of a magnetic field. The magnetic field destroys connection between the soil particles and the surrounding water capsule and stimulates the crystallization and formation of solid structures in the solution as it passes through the conditioner. A suitable magnetic conditioner 111 is manufactured by AQA Magnetic International Inc., of N. Safety Harbor, Florida, under the product designation C-8. The size of the magnetic conditioner depends essentially on the pipe size at that portion of the system.

The water clarification equipment 112 removes the magnetically coagulated particles from the water by means of an aerator. This process is similar to those mentioned above. An aerator applied to the metallic particles causes air bubbles to attach to the particles, lifting them by buoyancy to the surface of the water. When the particles float to the surface of the water clarification unit, they are collected by scraping equipment and return to the dewatering machinery. Suitable water clarification equipment is sold by OrTech Inc. Solid, of Bedford, Ohio under the tradename Hydro Float. Any soil effluent from the water clarification equipment 112 is transported back to the input of solid dewatering equipment 105a and, is eventually included in the raw material for lightweight aggregate production.

To rid the water of contaminants, the liquid is flushed through the desalination and waste clean-up equipment 113. Here, the solution passes through the chemical treatment, precipitation, coagulation and filtration and removes any heavy metal oxides and salts. A suitable purification machine is sold by Graver Co. of Union, New York, under the product designation Lamela waste water treatment system, Model 11225, 500 GMM. This system includes Lamela clarifiers, filters, an acid and polymer feed system, and a pH adjustment tank. The water is then ready to be recycled to the dredging site or used for other purposes..

Returning to the treatment of the solids, the cake-like solid output from dewatering equipment 105b is taken via conveyer belt 205 to the lightweight aggregate production equipment 107. This equipment fabricates the aggregate according to known methods.

Presently, raw material, which can be either expanded clay, shale or slate, is used to produce lightweight aggregate. The material is processed in rotary kilns with an initial moisture level of 18–20% at a temperature of about 2100° F. or 1140° C. By exposing the material to extremely high temperatures in the kiln and by the above mentioned chelating agents in the reactors 103a, 103b, organic contaminants and heavy metals can effectively be eliminated.

The aggregate is further converted until it reaches a pyroplastic state with a viscosity high enough to entrap gas. For each type of raw material or dredging project, a different viscosity level may be appropriate to entrap gas. However, it is not readily possible to measure the viscosity of molten material under such conditions. It is, however, possible to measure temperature. The appropriate temperature is determined by routine experimentation for each general set of conditions. The gas liberated from the heating is trapped by the aggregate and expands the material into a porous substance which, when cooled is ready to be used by builders. Lightweight aggregate is used for concrete blocks, structural concrete, road anti-skid material, etc.

The plasticity of the substance is controlled by the amount of flux compounds, such as AlO, FeO, CaO, MgO, KO and NaO in the material These oxides react with SiO to form the complex compounds of light aggregate, for instance MgSiO. In addition, the liberation of the gasses and therefore the expansion of the material is controlled by other minerals present; several examples are hematite, pyrite, calcite, dolomite and carbonaceous limonite. These minerals have a higher melting point than the other normal constituents of the dredged soil at this stage. Thus, increasing the percentage of these control minerals decreases the viscosity and thus, the degree of expansion of the material. To increase the amount of gas present, organic materials like oil and gasoline are added to the raw material.

Sea clay, shale, and especially silt naturally include the organic compounds and gasses necessary to produce the building aggregate, so little else needs to be added during the production process with such starting materials.

With conventional methods, lightweight aggregate can be produced from certain contaminated soil. Under high temperature, some contaminating ingredients burn off and are caught by filters that are part of the lightweight aggregate kiln. However, if the dredged material contains heavy metals, it is not suitable for production under conventional methods, because heavy metals cannot be transformed into a gaseous state and released from the aggregate. According to the present invention, however, the heavy metals are transformed in reactors 103a and 103b into an aqueous solution. The final aggregate product is transported from the production equipment 107 to 108.

Turning now to the molded brick line, the cake-like solid output from the solid dewatering equipment 105a passes to the molded brick machine 106. Any liquid effluent from the liquid/solid separation equipment and solid dewatering equipment 105a and 105b is transported to the magnetic conditioner 111, where the coagulation process of the fine particles is undertaken. At brick machine 106, it is mixed with 6–10% of cement and pressed in a molding machine under a pressure of not less than 200 kg/sq. cm, with specific temperature and humidity settings A preferred temperature is in the range of 30°–50° C. and a preferred humidity is in the range of 90–100% The high pressure is required to break down the magnetic forces found in silt due to the presence of certain organic substances. These organic substances prevent dewatering and keep the microparticles from adhering to each other and forming cement. The material should be dried over a 12–24 hour period.

To improve this process, an appropriate static electric field should be arranged inside the drier. The electric field helps to exclude the moisture from the drying material. The electric field can be created using equipment sold by Ion System, Inc. of Berkeley, Calif. and installed in standard or custom storages from Autech, of Newport News, Va.

A "pick and place" robot 109 transports the bricks to the curing bins 110. The temperature and humidity are carefully controlled, and a set of electrodes 101 powered by the high voltage power supply 114 ionizes the air in curing bin 110 to provide appropriate electrostatic conditions to accelerate the bonding in the cement. The bricks should remain in these bins for not less than 24 hours.

If a mechanical dredger is being employed (FIG. 2), a separate barge 194 or large holding tank is provided for the product picked up by dredger 198. Mechanically dredged material is too dense to be pumped. Therefore, the soil must be diluted with water recycled through line 310 from the liquid/solid separator and solid dewatering equipment 211. The dredged soil is forced by means of a pump from barge 194 into the hold 202.

Figure 2:
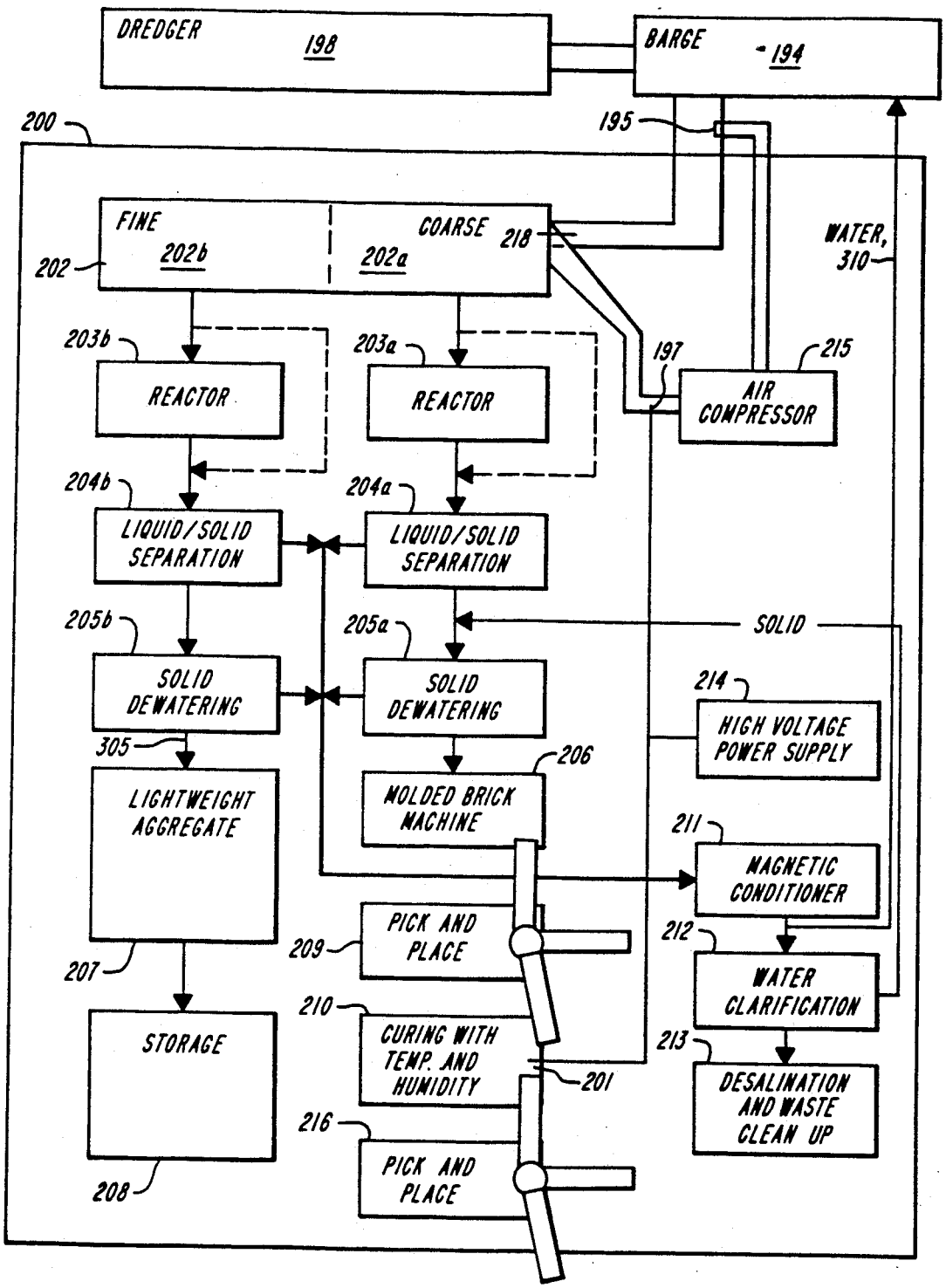
FIG. 2 shows schematically the apparatus of the invention and the flow of material according to an embodiment using a mechanical dredger.

In other respects, the embodiment of the invention shown schematically in FIG. 2, using a mechanical dredging device, is similar to the embodiment using a suction dredger shown in FIG. 1.

Aeration is provided by compressor 215 at the output from barge 194. The soil is further aerated and ionized at electrode 197, located at the inlet to hold 202, powered by high voltage power supply 214, to insure separation of the soil into coarse and fine constituents. A suitable power supply, as indicated above, is available from Ion Systems, Inc. of Berkeley, Calif.

Elements shown in FIG. 2 with respect to the mechanical dredging embodiment are designated generally be reference numerals have the same least significant digits as corresponding elements shown in FIG. 1 in connection with the suction dredger.

Thus, the present invention offers a fundamentally new solution to an old problem. The invention avoids the need for any disposal operation due to the following innovative techniques:

An air system separates soil particles from the water.

Liquid/solid separation equipment accomplishes preliminary dewatering.

The combined use of liquid/solid separation and solid dewatering equipment provides optimal moisture of soil.

The combined use of water clarification equipment and solid dewatering equipment clarifies the water.

Recycled effluent from the liquid/solid separator and solid dewatering equipment dilutes dredged soil.

Magnetic conditioning transfers magnetic polarity from water to soil, and effectively separates the two.

In addition, transportation processes become unnecessary due to the following:

All the dewatering, soil and water treatment, and production processes take place directly on the buoyant unit.

Combined use of magnetic water treatment and clarification equipment treats the water and thus there is no need to transport contaminated water to a land based treatment facility.

Use of temperature and humidity controls, and high voltage electric field accelerates drying of molded brick.

In sum, the present invention offers an innovative, environmentally safe, and productive method to dredge sea and river ports.

The foregoing specification should be taken as illustrative only and not limiting in any sense. Variations and modifications will be understood by those of ordinary skill in the art.

Having described the invention, what is claimed is

1. An apparatus comprising:
  a. at least one buoyant platform means for supporting equipment at the surface of a waterway;
  b. means for raising sediment from beneath a waterway to the at least one buoyant platform means at the surface of the water; and
  c. means for fabricating molded brick from said sediment supported by said at least one platform means at the surface of said waterway.

2. The apparatus of claim 1, further comprising means for fabricating light weight aggregate from said sediment supported by said at least one platform means at the surface of said waterway.

3. An apparatus comprising:
  a. at least one buoyant platform means for supporting equipment at the surface of a waterway;
  b. means for raising sediment from beneath a waterway to the at least one buoyant platform means at the surface of the waterway; and
  c. means for fabricating lightweight aggregate from said sediment supported by said at least one platform means at the surface of said waterway.

4. An apparatus comprising:
  a. at least one buoyant platform means for supporting equipment at the surface of a waterway;
  b. means for raising sediment from beneath a waterway to the at least one buoyant platform means at the surface of the waterway;
  c. means for fabricating building materials from said sediment supported by said at least one platform means at the surface of said waterway; and
  d. means for separating the raised sediment into coarse components and fine components, said means for separating being supported by said at least one platform means at the surface of said waterway.

5. The apparatus of claim 4, said means for separating the raised sediment comprising means for aerating said sediment with ionized air.

6. The apparatus of claim 5, said means for separating the raised sediment further comprising means for holding said separated sediment, having an inlet port, said inlet port situated adjacent said means for aerating.

7. The apparatus of claim 4, said means for fabricating building materials comprising:
  a. chemical reactor means for removing organic contaminants from said raised sediment;
  b. means for centrifugally removing water from said raised sediment; and
  c. means for removing water from said raised sediment by mechanical pressure.

8. The apparatus of claim 7, said means for fabricating building materials comprising means for fabricating at least two different types of building materials, and for each type of building material, further comprising:
  a. separate chemical reactor means for removing inorganic contaminants;
  b. separate means for centrifugally removing water from said raised sediment; and
  c. separate means for removing water from said raised sediment by mechanical pressure.

9. The apparatus of claim 7, further comprising means for heating said treated sediment to between 1000° C. and 1500° C.

10. The apparatus of claim 4, said means for fabricating building materials comprising means for fabricating lightweight aggregate.

11. The apparatus of claim 4, said means for fabricating building materials comprising means for fabricating molded brick.

12. The apparatus of claim 11, said means for fabricating molded brick comprising means for curing said brick maintained at a temperature of between 30° C.-50° C. and a humidity range of between 90-100%.

13. The apparatus of claim 4, comprising means for removing water entrained in said sediment from said sediment during said sediment and means for purifying said removed water, said means for purifying said removed water comprising:
  a. means for coagulating impurity particles in said water; and
  b. means for removing said coagulated particles for said water.

14. The apparatus of claim 13, said means for coagulating comprising means for magnetic conditioning.

15. The apparatus of claim 14 said means for removing comprising means for aerating said coagulated particles so that they float on a surface of said water and means for removing said coagulated particles from said surface.

* * * * *